No. 869,803. PATENTED OCT. 29, 1907.
W. E. PERRY.
ATTACHMENT FOR DRAFT HARNESS.
APPLICATION FILED MAY 10, 1907.
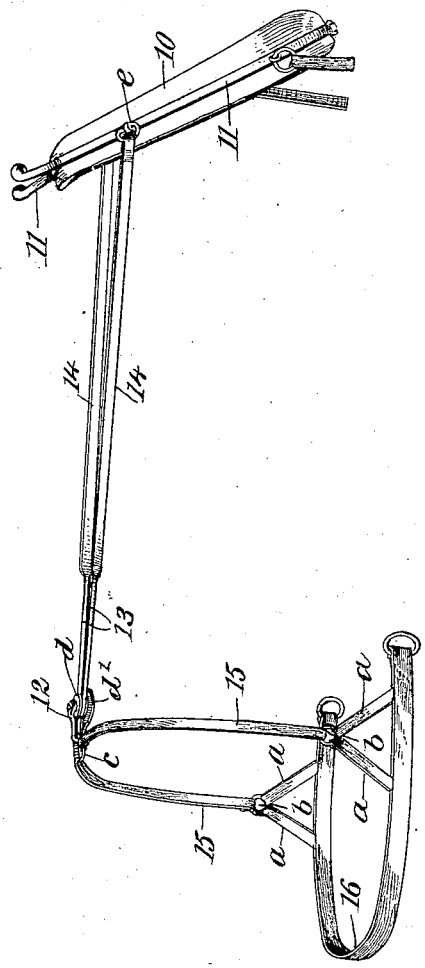
WITNESSES
INVENTOR
Watson E. Perry
BY
ATTORNEYS

UNITED STATES PATENT OFFICE.

WATSON E. PERRY, OF WARRENSBURG, NEW YORK.

ATTACHMENT FOR DRAFT-HARNESS.

No. 869,803.      Specification of Letters Patent.      Patented Oct. 29, 1907.

Application filed May 10, 1907. Serial No. 372,893.

*To all whom it may concern:*

Be it known that I, WATSON E. PERRY, a citizen of the United States, and a resident of Warrensburg, in the county of Warren and State of New York, have invented a new and Improved Attachment for Draft-Harness, of which the following is a full, clear, and exact description.

This invention relates to harness for draft animals.

Ordinarily the heavy leather harness is liable to change its position on the rump and haunches of the animal while the beast is pulling. This movement of the hip strap, back strap and breeching creates friction that frequently produces sores that greatly irritate the animal, and from their position are difficult to heal.

The purpose of this invention is to provide a novel simple attachment for well known draft harness, which will prevent friction upon the skin of the animal while working with the harness on it, and thus avoid the chafing action of parts of the latter, that would result in rubbing, abrasion and injury to the skin of the beast.

The invention consists in the novel construction and combination of the parts, as hereinafter described and defined in the claims.

Reference is to be had to the accompanying drawing forming a part of this specification, the view shown being a perspective representation of a draft-harness having the improvement embodied therewith:

The collar 10 and hames 11 mounted thereon, are of any approved construction, other well known details of the harness comprising the paired hip straps 15, 15, breeching 16, and hip strap extensions $a$, that are connected with the lower ends of said straps 15 by rings $b$, and diverge in pairs therefrom, having their lower ends attached upon the breeching 16, near its ends. The hip straps 15 are joined together by a ring $c$, that is secured between their upper ends, this being a common provision for connecting the ordinary back strap therewith.

The improvement takes the place of a common back-strap, and consists of the following details:

Upon the ring $c$, a bracket frame 12 is loosely secured, it consisting of a substantially U-shaped metal strip, between the ends of which a preferably grooved pulley $d$ is inserted and pivoted, and as shown, the lower member of the bracket frame is widened, forming a flat pad $d'$ for engagement with the back of an animal whereon the harness is placed for service.

The back strap that is a feature of the improvement is in the form of a looped strap, which at and near its central doubled portion is preferably rounded to give it rope form, and this looped portion 13 is passed around the pulley $d$, trending forwardly. The flat portions 14 of the doubled back strap are extended to the hames 11, and at their extremities said strap members are loosely secured thereto, as shown for one strap member at $e$.

The traces for connecting the hames with a load to be drawn, and other common details for the harness that do not have relation with the invention have been omitted from the drawing, it being obvious that these completing details have been supplied when the harness is ready for service.

Assuming that the harness in complete condition has been mounted upon a draft animal, and connected with a load to be pulled by the animal, the movements of the beast will cause the looped back strap to work around the pulley $d$, which will neutralize any tendency of the hip straps to change their position, and thus prevent any abrasion of the skin of the animal. The pad portion of the bracket frame that supports the pulley $d$ will not change its position, and the usual abrasion of the skin on the rump of the animal will be prevented.

As the hip straps do not shift on the rump of the beast while working, it will be seen that the breeching 16 remains in normal place, and avoids twisting or rubbing on the flanks of the animal, thus preventing any abrasion of the skin and consequent irritation.

Having thus described my invention, I claim as new and desire to secure by Letters Patent:

1. The combination, with draft harness having a pair of hames and a hip strap, of a pulley supported to rotate and connected with the crown of the hip strap, and a flexible looped connection passed around the pulley at its bight and having its ends connected with the hames.

2. The combination with draft harness embodying a collar, hames thereon, a two-part hip strap, joined together by a ring, and a breeching connected to the pendent ends of the hip straps, of a bracket frame bent into U-shape to produce two spaced limbs thereon, a bearing pad on one of said limbs, a pulley pivoted between the limbs, and a looped back strap having a rope-like middle portion that engages with the pulley and extends forward therefrom in the form of flat strap members, joined at their extremities to the hames.

In testimony whereof I have signed my name to this specification in the presence of two subscribing witnesses.

WATSON E. PERRY.

Witnesses:
     L. E. CRANDALL,
     ISABEL M. CROSBIE.